United States Patent [19]

Keeton

[11] Patent Number: 4,471,568
[45] Date of Patent: Sep. 18, 1984

[54] FEEDING HERBICIDE TO A ROLLER FOR TRANSFER ONTO PLANTS

[76] Inventor: John H. Keeton, P.O. Box 296, Campbellsville, Ky. 42718

[21] Appl. No.: 315,652

[22] Filed: Oct. 27, 1981

[51] Int. Cl.³ ............................................. A01G 16/00
[52] U.S. Cl. ...................................................... 47/1.5
[58] Field of Search ...................... 47/1.5, 62; 137/38; 406/183; 239/443; 400/693

[56] References Cited

U.S. PATENT DOCUMENTS

| | | | |
|---|---|---|---|
| 2,533,574 | 12/1950 | Gerlach . | |
| 2,832,290 | 4/1958 | Mitchell et al. . | |
| 2,869,460 | 1/1959 | Worthington . | |
| 2,933,095 | 4/1960 | Rumsey | 137/38 |
| 3,021,642 | 2/1962 | Ewing | 47/1.5 |
| 3,972,340 | 8/1976 | Miller et al. | 137/38 |
| 4,068,635 | 1/1978 | Yunick | 137/38 |
| 4,079,826 | 3/1978 | Shaw | 400/693 |
| 4,189,867 | 2/1980 | Schneck | 47/62 |
| 4,347,684 | 9/1982 | Keeton | 47/1.5 |

FOREIGN PATENT DOCUMENTS 147753 2/1967 New Zealand .

*Primary Examiner*—Robert E. Bagwill
*Assistant Examiner*—Bradley M. Lewis
*Attorney, Agent, or Firm*—Cushman, Darby & Cushman

[57] ABSTRACT

A liquid applicator roller apparatus evenly applies liquids to plants even when moving over uneven terrain. A sponge extends into engagement with the peripheral surface of the horizontally mounted applicator roller for depositing a film of liquid on the roller surface just before it contacts plants. Liquid is supplied to the sponge, and a metering device controls the flow of liquid to the sponge to ensure that the elevated end of the sponge is fed with liquid when one end is higher than the other. The metering apparatus includes a housing having a central bore parallel to the roller, and liquid connectors at opposite ends of the bore having sealing surfaces which cooperate with a metal ball that rolls within the bore. A supply line extends into the housing from the top, to supply liquid to the bore.

8 Claims, 3 Drawing Figures

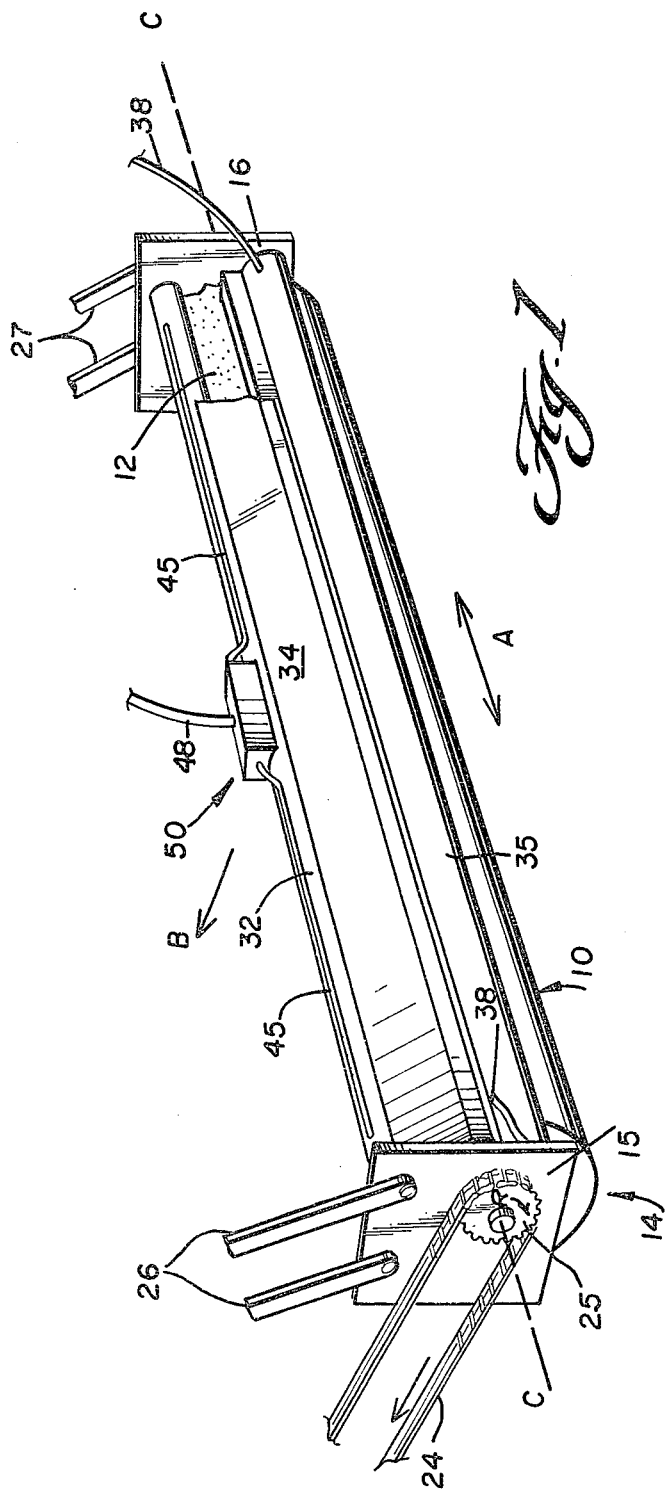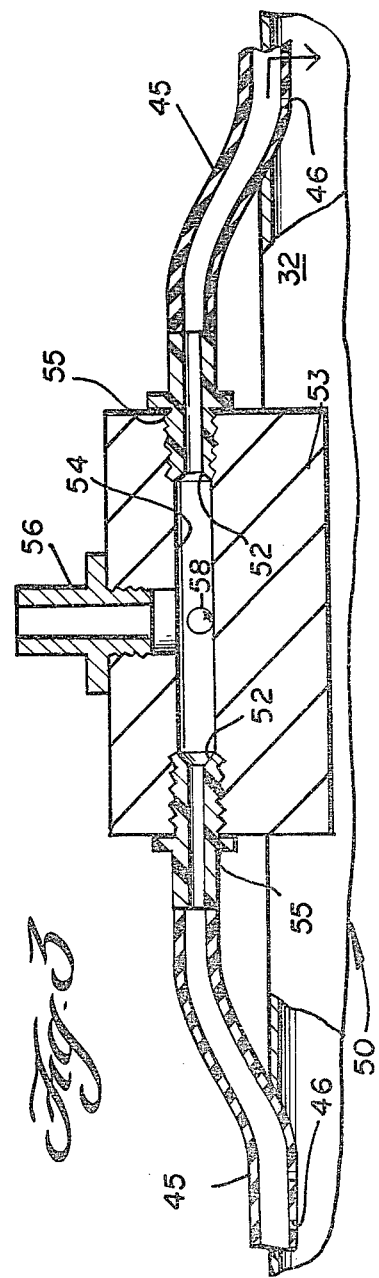

FEEDING HERBICIDE TO A ROLLER FOR TRANSFER ONTO PLANTS

BACKGROUND AND SUMMARY OF THE INVENTION

In copending applications Ser. No. 184,192 filed Sept. 5, 1980 and Ser. No. 199,365 filed Oct. 21, 1980 (the disclosures of each of which are incorporated by reference herein), an apparatus is provided which greatly facilitates the application of liquids—especially liquid contact hercibides—to plants. While such apparatus is emminently suited for performing its intended function, if operated on uneven terrain for extended periods of time, there may be a tendency for the elevated portions thereof to become "starved" of liquid, with resultant uneven application to plants. The present invention seeks to overcome such a problem in a simple and effective manner.

According to the present invention, metering means are provided for supplying liquid to a sponge (or like transfer means), which in turn supplies the liquid to the applicator roller, so that if one end of the roller is elevated with respect to the other, liquid will be supplied to the high end of the transfer means and roller. A supply conduit, such as flexible tubing, extends generally along the length of the transfer means and has a plurality of openings in the bottom thereof through which liquid can flow and drip onto high end of the transfer means and roller. A supply conduit, such as flexible tubing, extends generally along the length of the transfer means and has a plurality of openings in the bottom thereof through which liquid can flow and drip onto the transfer means. A housing is disposed in operative engagement with a central portion of the conduit, and means define a pair of opposed sealing surfaces at opposite ends of the housing in communication with a bore in the housing parallel to the applicator roller. A tilt-responsive sealing member, such as metal ball having a diameter smaller than the bore, is mounted within the bore between the sealing surfaces for cooperation with the lowermost of the sealing surfaces to provide sealing therewith when the roller is tilted so that one end thereof is perceptibly higher than the other end.

The metering means according to the invention is extremely simple, and may be designed so that it consists of merely the housing with sealing surfaces an interiorly mounted sealing member, and a supply tube extending into the housing from the top thereof, generally perpendicular to the bore. However where the roller is particularly long, it may be desirable to provide a plurality of central housings spaced from each other along the conduit, with a different supply tube extending to each central housing.

It is the primary object of the present invention to provide a simple and effective structure for supplying liquid to a plant-contacting apparatus even when operated over uneven terrain. This and other objects of the invention will become clear from an inspection of the detailed description of the invention, and from the appended claims.

BRIEF DESCRIPTION OF THE DRAWINGS

FIG. 1 is a perspective view of an exemplary apparatus according to the present invention;

FIG. 3 is a detail front cross-sectional view of exemplary metering means according to the present invention utilizable in the apparatus of FIG. 1.

DETAILED DESCRIPTION OF THE DRAWINGS

Figure 2:
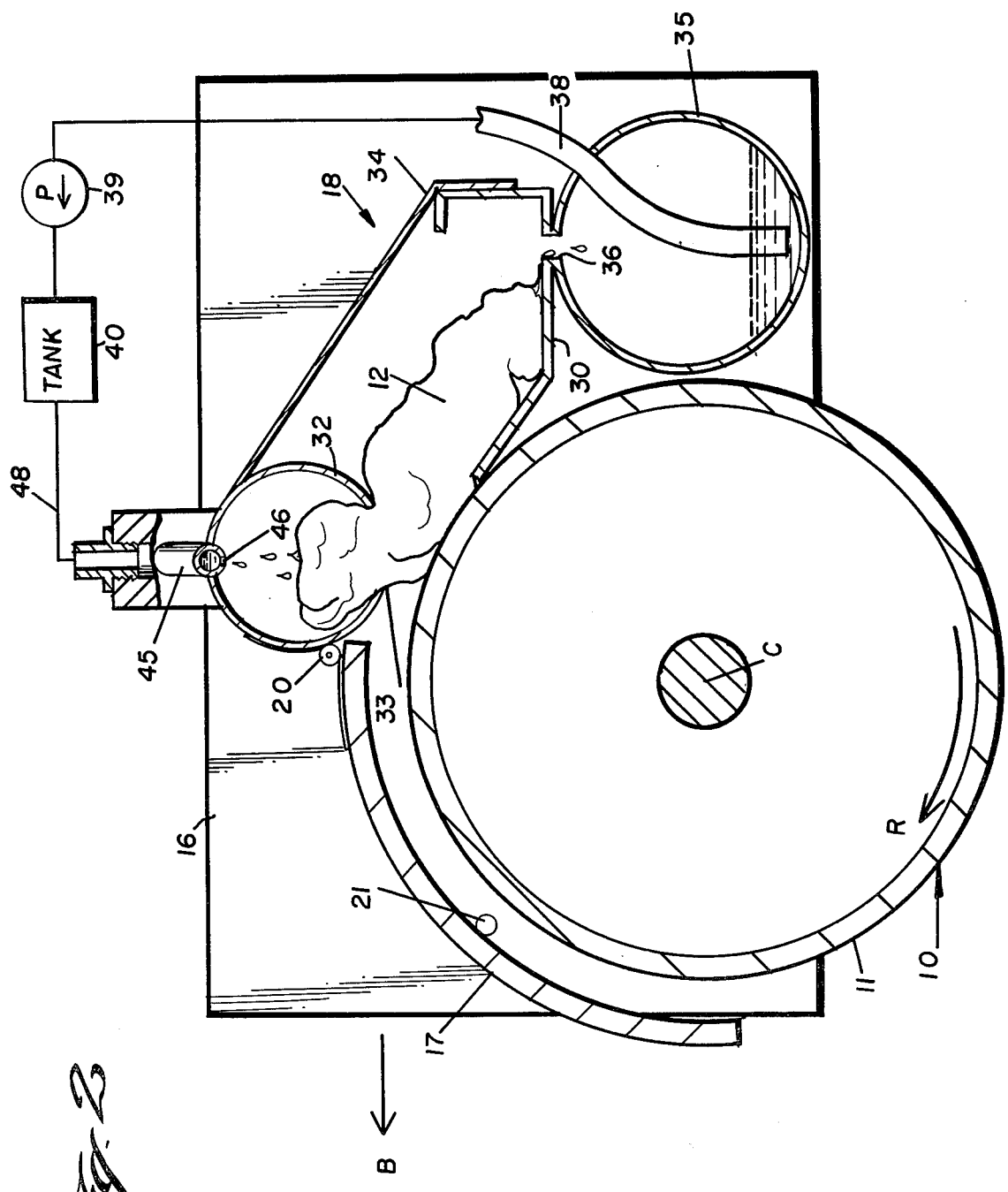
FIG. 2 is a side view, partly in cross-section and partly in elevation, of the apparatus of FIG. 1.

The basic components of the apparatus of FIGS. 1 and 2 are substantially identical to the components illustrated and described in copending applications Ser. No. 184,192 filed Sept. 5, 1980 and Ser. No. 199,365 filed Oct. 21, 1980, the disclosures of which are hereby incorporated by reference herein. In particular, a liquid applicator roller 10, which may comprise a hard plastic tube, has a peripheral surface 11 thereof onto which a film of liquid is deposited by a sponge 12 or like liquid transfer means, the surface 11 coming into contact with plants as it rotates in direction R. The roller 11 is mounted by a housing, shown generally by reference numeral 14 and including sides 15, 16 enclosing side portions of the roller, a top front portion, or cover, 17, and rear portions shown collectively by the reference numeral 18 to be hereinafter described. As illustrated most clearly in FIG. 2, only a bottom portion of the roller 10 extends outwardly from the housing, and it is that portion which may be brought into contact with plants to which liquid is to be applied.

The front cover 17 may be pivotally mounted to the side plates 15, 16, as by hinge 20 (see FIG. 2), allowing it to be moved upwardly to allow inspection and maintenance of the roller 10 and other components. A stop 21 extending from side plate 16, or a like component, may be provided for preventing movement of the cover 17 into engagement with roller 10, and suitable means may be provided for locking the cover 17 in place if desired. The housing 14 and roller 10 are elongated in a dimension A, which is substantially perpendicular to the direction of movement B of the apparatus during use.

The roller 10 is mounted, and the housing 14 is oriented, so that the axis of rotation C of roller 10 is generally horizontal, with the sponge 12 mounted at a top portion of the roller 10. While the roller 10 may be powered in a wide variety of manners, as described in said copending applications, in the exemplary embodiment illustrated in FIG. 1, the roller 10 is powered by the chain and sprocket arrangement 24, 25, illustrated in FIG. 1. Sprocket 25 is operatively connected to one end of the roller 10, and chain 24 operatively engages the sprocket 25 and a sprocket mounted to a motor (not shown) on a vehicle to which the apparatus 10, 14 is mounted. Mounting to the vehicle, such as a tractor, can be accomplished by any suitable mechanism, such as the pivoted links 26, 27, mounting the plates 15, 16 to a tractor tool bar, or the like. The links 26, 27 can be acted upon to move the plates 15, 16 to any desired relative position with respect to the ground, although in normal operation the roller periphery 11 will always be spaced from the ground.

The liquid supply mechanism for supplying liquid to the sponge 12, and ultimately the peripheral surface 11 of the roller 10, includes the rear portions 18 defining the rear of the housing 14. As illustrated most clearly in FIGS. 1 and 2 these components include a liquid housing or reservoir including housing component 30 from which the sponge 12 extends into contact with the roller periphery 11, upper tube 32 having a bottom slit 33 formed therein for engaging the sponge 12 and holding it in place, and back cover 34. Slit 33 positively holds sponge 12 in place despite tilting of the housing 14, and tube 32 confines any excess liquid above sponge 12 so that it remains in contact therewith.

Components extend substantially the entire length of the roller 10 in the dimension A, as does a storage tank 35 mounted below the liquid housing 30. A slit, or a plurality of openings, 36 is provided in the bottom of the housing portion 30 for allowing liquid to drain therefrom into the tank 35, which liquid is then ultimately returned to the sponge 12 utilizing the recirculating means including return line 38, pump 39, and vehicle mounted storage tank 40.

Supply means are provided associated with the tube 32 for supplying liquid to the top of the sponge 12, as indicated schematically in FIG. 2. The supply means primarily comprises a supply conduit, such as flexible tubing 45, extending substantially the length of the roller 10 in dimension A. The conduit 45 preferably is positioned in a slit in the top of the tube 32 so that openings 46 formed along the length of the tubing 45 open up to the interior of the tube 32, the liquid dripping through the openings 46 onto the top of the sponge 12. A supply tube 48 supplies the liquid from vehicle-mounted storage tank 40 to the conduit 45.

According to the present invention, metering means—shown generally by reference numeral 50—are provided for controlling the flow of liquid from the supply means 48, 45 to the transfer means 12 for feeding the elevated end of the transfer means 12 when one end thereof is higher than the other. For instance when the apparatus is operated on uneven terrain, there can be many times that the plate 16 thereof is higher than the plate 15, or vice versa. If the apparatus is operated with one end (e.g. plate 16) thereof higher than the other end for an extended period of time, there is a tendency for the higher end (the roller 10 and sponge 12 near plate 16) to become "starved" of liquid, resulting in uneven application of liquid onto the plants. This is what the metering means 50 corrects.

In the preferred embodiment of the metering means 50 illustrated in the drawings, a central portion of the conduit 45 is provided with means defining sealing surfaces 52 spaced from each other in a dimension A. Preferably the central portion of the conduit 45 is defined by a housing 53 having means defining a bore 54 therein, which bore 54 is parallel to the roller 10. The sealing surfaces 52 are defined at the ends of liquid connectors 55 screw-threaded into opposite ends of the housing 53 in communication with the bore 54, with the supply tube 48 operatively communicating with the bore 54 between the surfaces 52. The supply tube 48 is preferably connected to liquid connector 56, which in turn is screw-threaded into a top portion of the housing 53, extending in a dimension generally perpendicular to the bore 54 (see FIG. 3). A tilt-responsive sealing member, such as metal (e.g. steel) ball 58 is positioned within the bore 54, and engageable with the sealing surfaces 52.

The ball 58 has a diameter significantly smaller than the diameter of the bore 54, but large enough so that when it cooperates with either of the sealing surfaces 52 it substantially prevents the flow of liquid therepast. For instance when the right-hand side of the apparatus (as illustrated in FIG. 3) is elevated, the ball 58 will roll into contact with the left-hand sealing surface 52, providing a seal therewith and preventing liquid flowing therepast. Thus all the liquid supplied by the supply tube 48 will flow into the right-hand portion of the supply line 45, to ensure that liquid will be supplied to the high side of the sponge 12. Liquid starvation at the low side of the sponge 12 will not occur since some liquid will still flow downwardly within pipe 32 toward the lower end of the sponge 12.

For simplicity of operation, it is preferred that the metering means consist of the components 50 illustrated in FIG. 3. However under some circumstances where the roller 10 is especially long, it may be desirable to provide a plurality of housings 53 at spaced central portions of the conduit 45.

Operation

A typical operation of the apparatus heretofore described will now be set forth:

The housing 14 is mounted to a tractor tool bar by links 26, 27, and sprocket 25 is connected by chain 24 to a motor on a tractor. A storage tank 40 operatively mounted on the tractor supplies liquid, such as contact herbicide (like ROUNDUP by Monsanto) to the sponge 12 and roller 10.

The tractor is driven in direction B, while the motor powers the sprocket 25 in direction R so that the periphery 11 of roller 10 is moved into wiping contacts with plants. The roller 10 is mounted above the ground, and liquid is supplied thereto from the tank 40 to supply tube 48 and supply conduits 45. When the apparatus is operated on level land, liquid flows through supply tube 48 through bore 54 through both liquid connectors 55 into conduit 45, and drips through openings 46 onto the top of the sponge 12 held by tube 32. The roller periphery 11 rotating into contact with the wet sponge just prior to contacting the plants will have a film of the liquid deposited thereon, which film will in turn be transferred onto the plants. Any excess liquid not absorbed by the sponge 12 will drip through opening or openings 36 in the bottom of liquid housing 30 into the storage tank 35, to be returned through return lines 38 to pump 39 and tank 40.

Should the apparatus be operated on uneven terrain for an extended length of time, the ball 38 will roll in bore 54 to the lowermost sealing surface 52. The ball has sufficient density and mass to roll downwardly even though the bore 54 is substantially filled with liquid, and makes a relatively tight sealing engagement with the lowermost surface 52, preventing liquid flowing through the connector 55 associated therewith. Thus all the liquid in the bore 54 will flow through the uppermost tubular connector 55 into the uppermost portion of the supply conduit 45, ensuring that the uppermost portion of the sponge 12 is not starved of liquid.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Apparatus for applying liquid to plants comprising: a liquid applicator roller for contacting plants and transferring liquid from the roller surface to the plants; a housing for mounting said roller for rotation about a given axis; transfer means having a portion extending into engagement with the peripheral surface of said applicator roller for depositing a film of liquid on said applicator roller surface before it contacts plants; means for supplying liquid to said transfer means; control means for controlling the flow of liquid from supplying means to said transfer means for feeding the elevated end of said transfer means when one end thereof is higher than the other;

said supply means comprising: a conduit extending generally along the length of said transfer means and having means defining a plurality of openings therein through which liquid can flow onto said transfer means; means defining a pair of opposed sealing surfaces in a central portion of said conduit; a supply tube feeding liquid from an exterior source to said conduit between said sealing surfaces; and a tilt-responsive sealing member mounted with said conduit central portion between said sealing surfaces for cooperation with the lowermost of said sealing surfaces to provide sealing therewith when said conduit is tilted so that one end thereof is perceptibly higher than the other end thereof; and said central portion of said conduit comprises a housing having means defining a bore therein substantially parallel to said roller;

said means defining said sealing surfaces comprising liquid connectors extending into opposite ends of said housing in liquid communication with said bore; and said supply tube being in liquid communication with said bore extending into said housing in a direction generally perpendicular to said bore and from above said housing.

2. Apparatus as recited in claim 1 wherein said tilt-responsive sealing member comprises a metal ball having a smaller diameter than said bore diameter, but having a large enough diameter to cooperate with one of said sealing surfaces to substantially prevent flow through the connector associated therewith, and a large enough density and mass to move in said bore in response to tilting even when the bore is liquid-filled.

3. Apparatus as recited in claims 1 or 2 wherein said conduit comprises flexible tubing having openings formed at spaced locations along the bottom thereof, and wherein said transfer means comprises a sponge.

4. Apparatus as recited in claim 1 wherein said control means consists of the recited components.

5. Apparatus as recited in claim 1 further comprising a tube having a slit formed therein for holding said transfer means in place, said means for supplying liquid to said transfer means supplying liquid through a top portion of said tube and to said transfer means held thereby.

6. Apparatus for applying liquid to plants, comprising: a liquid applicator roller for contacting plants and transferring liquid from the roller surface to the plants; a housing for mounting said roller for rotation about a given axis, and covering said roller at the top and sides but being open at the bottom to allow peripheral surface of the roller to rotate out of the housing open bottom; means defining a liquid pool in said roller housing extending substantially the entire width of said roller housing and extending substantially the entire length of said applicator roller, said means comprising an elongated liquid housing having opposite ends in the dimension of elongation thereof; transfer means disposed in said liquid housing and extending outwardly from said liquid housing into engagement with the peripheral surface of said applicator roller for depositing a film of liquid on said applicator roller surface just before it contacts plants, said transfer means comprising a sponge disposed and held in said liquid housing and extending outwardly from said liquid housing into engagement with the peripheral surface of said applicator roller; means for mounting said housing so that it is spaced from the ground and movable with respect to the ground in a direction generally perpendicular to said axis of rotation of said applicator roller, and so that said applicator roller is spaced from the ground and said axis of rotation thereof is generally horizontal; a storage tank disposed below said liquid housing; means defining a plurality of openings in the bottom of said liquid housing for allowing draining of liquid from said liquid housing into said storage tank; means mounted adjacent a portion of said transfer means for supplying liquid to said transfer means; means for circulating liquid from said storage tank to said means for supplying liquid to said transfer means; and control means for controlling the flow of liquid from said means for supplying liquid to said transfer means so that liquid will be supplied to the elevated end of said housing when said housing is tilted so that one said end thereof is higher than the other said end thereof.

7. Apparatus for applying liquid to plants, comprising: a liquid applicator roller for contacting plants and transferring liquid from the roller surface to the plants; a housing for mounting said roller for rotation about a given axis, and covering said roller at the top and sides but being open at the bottom to allow peripheral surface of the roller to rotate out of the housing open bottom; means defining a liquid pool in said roller housing extending substantially the entire width of said roller housing and extending substantially the entire length of said applicator roller, said means comprising an elongated liquid housing having opposite ends in the dimension of elongation thereof; transfer means disposed in said liquid housing and extending outwardly from said liquid housing into engagement with the peripheral surface of said applicator roller for depositing a film of liquid on said applicator roller surface just before it contacts plants; means for mounting said housing so that it is spaced from the ground and movable with respect to the ground in a direction generally perpendicular to said axis of rotation of said applicator roller, and so that said applicator roller is spaced from the ground and said axis of rotation thereof is generally horizontal; a storage tank disposed below said liquid housing; means defining a plurality of openings in the bottom of said liquid housing for allowing draining of liquid from said liquid housing into said storage tank; means mounted adjacent a portion of said transfer means for supplying liquid to said transfer means; means for circulating liquid from said storage tank to said means for supplying liquid to said transfer means; and control means for controlling the flow of liquid from said means for supplying liquid to said transfer means so that liquid will be supplied to the elevated end of said housing when said housing is titled so that one said end thereof is higher than the other said end thereof;

said supply means comprising a conduit extending generally along the length of said transfer means and having means defining a plurality of openings therein through which liquid can flow onto said transfer means;

means defining a pair of opposed sealing surfaces in a central portion of said conduit;

a supply tube feeding liquid from an exterior source to said conduit between said sealing surface; and a tilt-responsive sealing member mounted within said conduit central portion between said sealing surfaces for cooperation with the lowermost of said sealing surface to provide sealing therewith when said conduit is tilted so that one end thereof is perceptibly higher than the other end thereof.

8. Apparatus as recited in claim 7 wherein said central portion comprises a housing having means defining a bore therein substantially parallel to said roller; and wherein said means defining said sealing surfaces comprise liquid connectors extending into opposite ends of said housing in liquid communication with said bore; and wherein said supply tube is in liquid communication with said bore extending into said housing in a direction generally perpendicular to said bore and from above said housing; and wherein said tilt-responsive sealing member comprises a metal ball having a smaller diameter than said bore diameter, but having a large enough diameter to cooperate with one of said sealing surfaces to substantially prevent flow through the connector associated therewith.

* * * * *